UNITED STATES PATENT OFFICE 2,454,746

CYCLOHEXYLALKYLAMINES

Glenn E. Ullyot, Philadelphia, Pa., assignor to Smith, Kline & French Laboratories, Philadelphia, Pa., a corporation of Pennsylvania No Drawing. Application May 13, 1947, Serial No. 747,857

4 Claims. (Cl. 260—563)

This invention relates to certain new secondary cyclohexylalkylamines and their salts.

From the broad standpoint, the new compounds contemplated by this invention comprise essentially secondary β-(cyclohexyl)-alkylamines, and organic and inorganic salts thereof, as indicated by the following general formula:

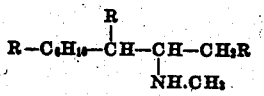

where R is a member of the group consisting of hydrogen and a methyl radical.

The amine bases in accordance with this invention will have various uses therapeutically for treatment of various conditions of the human and animal system, and in particular will be found highly desirable and efficient as volatile vasoconstrictors for use in, for example, an inhaler, as will also the non-toxic organic and inorganic salts and addition products thereof, produced with organic and inorganic acids yielding non-toxic ions, as for example, hydrochlorides, sulfates, carbonates, carbamates, tartrates, gluconates, phosphates, etc.

Examples of such bases and their salts and addition products are:

(a) β-(cyclohexyl)-isopropylmethylamine sulfate
(b) β-(cyclohexyl)-isopropylmethylamine carbamate
(c) β-(4-methylcyclohexyl)-isopropylmethylamine lactate
(d) 1-cyclohexyl-2-methylaminobutane acetate
(e) 2-cyclohexyl-3-methylaminobutane hydrochloride The secondary β-cyclohexylalkylamines and the salts and addition products thereof may be prepared in preferred form for therapeutic use, or as a therapeutic agent in purified form in various ways by procedure familiar to those skilled in the art. No claim to any particular method of preparation is made.

The secondary β-cyclohexylalkylamines may be conveniently prepared in racemic form, from which the dextrorotatory and levorotatory forms may be readily resolved by known procedure.

By way of example, the bases may conveniently be prepared by first preparing the cyclohexyl ketone corresponding to the desired amine. Such ketones, where not already commercially available, may be prepared by one of the standard methods.

Given the ketone, one mol of ketone is reacted with an excess of N-methyl formamide, followed by hydrolysis of the resulting formyl derivative, liberation of the amine by the addition of excess alkali and recovery and purification by any well known procedure.

The salts and addition products variously of the bases contemplated by this invention may be readily prepared from the bases by exact neutralization or reaction with an acid corresponding to the desired salt. It will be found that certain salts do not lend themselves to isolation in crystalline form, while others may be readily crystallized from a suitable solvent.

By way of illustrating the preparation of various representative members of this group of compounds within the scope of this invention in their racemic form, the following examples are detailed:

EXAMPLE 1

β-Cyclohexylisopropylmethylamine 33.6 grams of cyclohexylacetone, a compound known to the art, dissolved in 13 grams of 85% formic acid, is caused to interact with 72.0 grams of N-methyl formamide at 160–180° C. for four hours. This results in the formation of the formyl derivative of the amine, according to the following reaction:

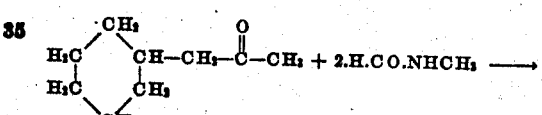

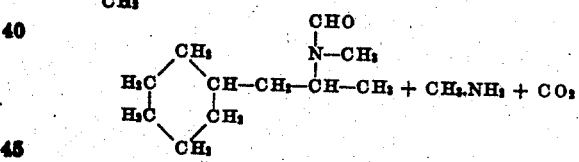

The formyl derivative is then hydrolyzed by refluxing with 50% sulfuric acid for about four hours, after which the hydrolysate is extracted with ether to remove the acid-insoluble material and the aqueous solution made strongly alkaline with any suitable alkalizing agent, for example, sodium hydroxide, to liberate the amine.

The amine is then taken up in ether, dried over potassium hydroxide and purified by distillation, preferably under reduced pressure. β-Cyclohexylisopropylmethylamine thus obtained boils at 90.0–92° C. at 22 mm. Hg.

β-Cyclohexylisopropylmethylamine sulfate may be readily prepared by exact neutralization of the amine with sulfuric acid and crystallization from a suitable solvent, for example, a mixture of absolute alcohol and absolute ether. This yields colorless crystals which began to soften at 100° C. and melted slowly at 115° C.–120° C.

EXAMPLE 2

β-(4-methylcyclohexyl)-isopropylmethylamine

The preparation of this compound is effected by following the directions under Example 1, substituting equal molar proportions of 4-methylcyclohexylacetone, a compound known to the art, for cyclohexylacetone. β-(4-Methylcyclohexyl)-isopropylmethylamine boils at 210–215° C. at atmospheric pressure.

EXAMPLE 3

1-cyclohexyl-2-methylaminobutane 1-phenyl-2-butanone (a compound known to the art) was converted into 1-phenyl-2-methylaminobutane by the N-methyl formamide process described in Example 1. This amine boiled at 226–230° C. One mole (163 g.) of 1-phenyl-2-methylaminobutane was dissolved in 500 cc. of 75% alcohol and treated with one mole of concentrated hydrochloric acid. Two grams of powdered charcoal and 10 cc. of 16% palladium chloride solution were added, and reduction was carried out at 50° C. at an initial pressure of 100 atmospheres. After the theoretical amount of hydrogen was absorbed, the catalyst was removed by filtration and the 1-cyclohexyl-2-methylaminobutane was isolated and purified by distillation; B. P. 220–225° C.

EXAMPLE 4

3-cyclohexyl-2-methylaminobutane 3-phenyl-2-butanone (a compound known to the art) was converted into 3-phenyl-2-methylaminobutane by the N-methyl formamide process described in Example 1. This amine boiled at 95–97° C./11 mm. One mole (163 g.) of 3-phenyl-2-methylaminobutane was converted into 3-cyclohexyl-2-methylaminobutane by reduction, using the procedure described in Example 3. The product boiled at 105–113° C./24 mm.

Where it is desired to have the dextrorotatory form or the levoratatory form of the β-cyclohexylalkylamines according to this invention, such may be readily obtained by resolving the racemic form. Resolution of the racemic form to obtain the dextrorotatory or levorotatory forms may be accomplished by known methods. Thus, for example, the separation of the dextrorotatory and levorotatory forms can be accomplished by fractional crystallization of the neutral and acid tartrates, a procedure known to the art and described, for example, in United States Letters Patent No. 2,276,508 and No. 2,276,509, both dated March 17, 1942, to Fred P. Nabenhauer.

As more specifically illustrative of procedure for separating the dextrorotatory and levorotatory forms from the racemic β-cyclohexylalkylamines, for example, dextrorotatory-β-cyclohexylisopropylmethylamine may be separated from the racemic amine by converting β-cyclohexylisopropylmethylamine into a neutral tartrate with an appropriate amount of tartaric acid in 1200 ml. of hot isopropyl alcohol. On seeding this solution and allowing it to cool to room temperature, about 317 g. of amine neutral tartrate is obtained. Repeated recrystallization of this material from isopropyl alcohol will give a neutral tartrate having dextrorotation $[\alpha]_D^{20} = +24.87$. From this neutral tartrate, dextrorotatory-β-cyclohexylisopropylmethylamine is isolated by dissolving the neutral tartrate in water, treating with alkali, extracting with a solvent, drying over sodium hydroxide and distilling. The dextrorotatory-β-cyclohexylisopropylmethylamine thus obtained boils at 78–79° C./10 mm. and has dextrorotation: $n_D^{20} = 1.4597$; $d_4^{20} = 0.851$; $[\alpha]_D^{20} = +8.85$.

The hydrochloride of this dextrorotatory amine will melt at 137.5–139° C. and has dextrorotation, $[\alpha]_D^{20} = +14.3$ ($c = 8$ in water).

As further illustrative, for example, levorotatory-β-cyclohexylisopropylmethylamine will be obtained from the racemic β-cyclohexylisopropylmethylamine by evaporating the filtrates obtained in the procedure above described for the separation of dextrorotatory-β-cyclohexylisopropylmethylamine, dissolving the residue thus obtained in one liter of hot alcohol consisting of 10% methyl and 90% ethyl alcohol and adding enough tartaric acid to convert the neutral tartrate into a bitartrate. To the solution thus obtained two liters of acetone are added and the solution cooled in an ice bath. About 483 grams of bitartrate salt will crystallize out and on isolation will have the rotation, about $[\alpha]_D^{20} = +10.25$ ($c = 8$ in water). One crystallization from acetone and alcohol (in the ratio of one liter of alcohol to two liters of acetone) followed by repeated recrystallizations from isopropyl alcohol, will effect isolation of β-cyclohexylisopropylmethylamine bitartrate having the rotation about $[\alpha]_D^{20} = +4.0$ ($c = 8$ in water). The free base will be levorotatory-β-cyclohexylisopropylmethylamine and in the form of free base will be isolated as described above and the product will have a boiling point of 95° C./23 mm. mercury and levorotation: $n_D^{20} = 1.4598$; $d_4^{15} = 0.852$; $[\alpha]_D^{20} = -8.81$ (pure liquid). The hydrochloride of the levorotatory form will melt at 137.5–139° C. and will have the rotation, $[\alpha]_D^{20} = -14.4$ ($c = 8$ in water).

Thus, the β-cyclohexylalkylamines contemplated by this invention may be in the racemic form comprising a mixture of their dextrorotatory and levorotatory forms or in the form of the dextrorotatory and levorotatory forms, respectively, which, as indicated, may be readily separated from the racemic mixture by well known procedure.

This application is a continuation-in-part of forfeited application Serial No. 568,387, filed December 15, 1944, which is a continuation-in-part of abandoned application Serial No. 428,375, filed January 27, 1942.

What I claim and desire to protect by Letters Patent is:

1. A compound selected from the group consisting of secondary β-cyclohexylalkylamines having the following general formula:

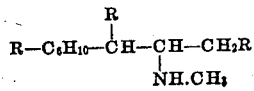

where R is a member of the group consisting of hydrogen and a methyl radical; and salts thereof.

2. β-Cyclohexylisopropylmethylamine and salts thereof.

3. β-(4-methylcyclohexyl)-isopropylmethylamine and salts thereof.

4. 3-cyclohexyl-2-methylaminobutane and salts thereof.

GLENN E. ULLYOT.

REFERENCES CITED

The following references are of record in the file of this patent:

UNITED STATES PATENTS

| Number | Name | Date |
|---|---|---|
| 1,712,709 | Lommel | May 14, 1929 |
| 1,793,176 | Klarer et al. | Feb. 17, 1931 |
| 2,278,123 | Heyn | Mar. 31, 1942 |
| 2,382,686 | Wenner | Aug. 14, 1945 |
| 2,384,700 | Schnider | Sept. 11, 1945 |

OTHER REFERENCES

Leithe, "Ber. deut. Chem.," vol. 65, pp. 660–666 (1932).

Coleman et al., "J. Am. Chem. Soc.," vol. 54, pp. 1982–1983 (1932).

Blicke et al., "J. Am. Chem. Soc.," vol. 61, pp. 91–93 (1939).

Gunn et al., "J. Physiol.," 1940, pp. 453, 470.